United States Patent [19]

Allen

[11] 4,368,711
[45] Jan. 18, 1983

[54] APPARATUS AND A METHOD FOR OPERATING AN INTERNAL COMBUSTION ENGINE

[75] Inventor: Larry D. Allen, Seattle, Wash.

[73] Assignees: Larry Allen; Robert Harrison; Harry Harbour; Gary Hisel; Thomas Kraft; Ansell Johnson; Harry Rose

[21] Appl. No.: 339,618

[22] Filed: Jan. 15, 1982

Related U.S. Application Data

[63] Continuation of Ser. No. 97,418, Nov. 26, 1979, abandoned, which is a continuation-in-part of Ser. No. 968,555, Dec. 11, 1978, abandoned.

[51] Int. Cl.³ .................... F02M 17/18; F02D 19/00
[52] U.S. Cl. .................... 123/522; 123/25 B; 123/25 R; 123/25 N; 123/25 K; 123/25 J
[58] Field of Search ............ 123/25 B, 25 E, 25 F, 123/25 J, 25 K, 25 L, 25 M, 25 N, 522

[56] References Cited

U.S. PATENT DOCUMENTS

| | | | |
|---|---|---|---|
| 3,186,394 | 6/1965 | Ramum | 123/522 |
| 3,713,429 | 1/1973 | Dwyre | 123/522 |
| 3,792,688 | 2/1974 | Grainger | 123/522 |
| 4,007,721 | 2/1977 | Regueiro | 123/522 |
| 4,023,538 | 5/1977 | Harpman | 123/25 B |
| 4,030,453 | 6/1977 | Sugimoto | 123/25 B |
| 4,114,566 | 9/1978 | Harpman | 123/25 B |

Primary Examiner—Ronald B. Cox
Attorney, Agent, or Firm—Christensen, O'Connor, Johnson & Kindness

[57] ABSTRACT

A water-augmented fuel and air supply system for an internal combustion engine which draws heated air into its intake manifold through two paths, one carrying the bulk of air, referred to as leaning air, drawn directly into the manifold, and the other providing a smaller stream of mixing air through a fuel and water vaporizer heated by engine exhaust. In the vaporizer, the heated mixing air flow acts upon a pool of liquid water and fuel to stimulate vaporization thereof. As engine temperature and engine exhaust temperature rise, the maximum vaporization stimulation effect of the impinging mixing air is no longer needed and is correspondingly reduced. The result is to permit cold starts and to provide a lean mixture of vaporous mixing air conducive to sustained economical engine operation, and increased power availability from the engine without incurring excessive rise in engine operating temperatures.

7 Claims, 1 Drawing Figure

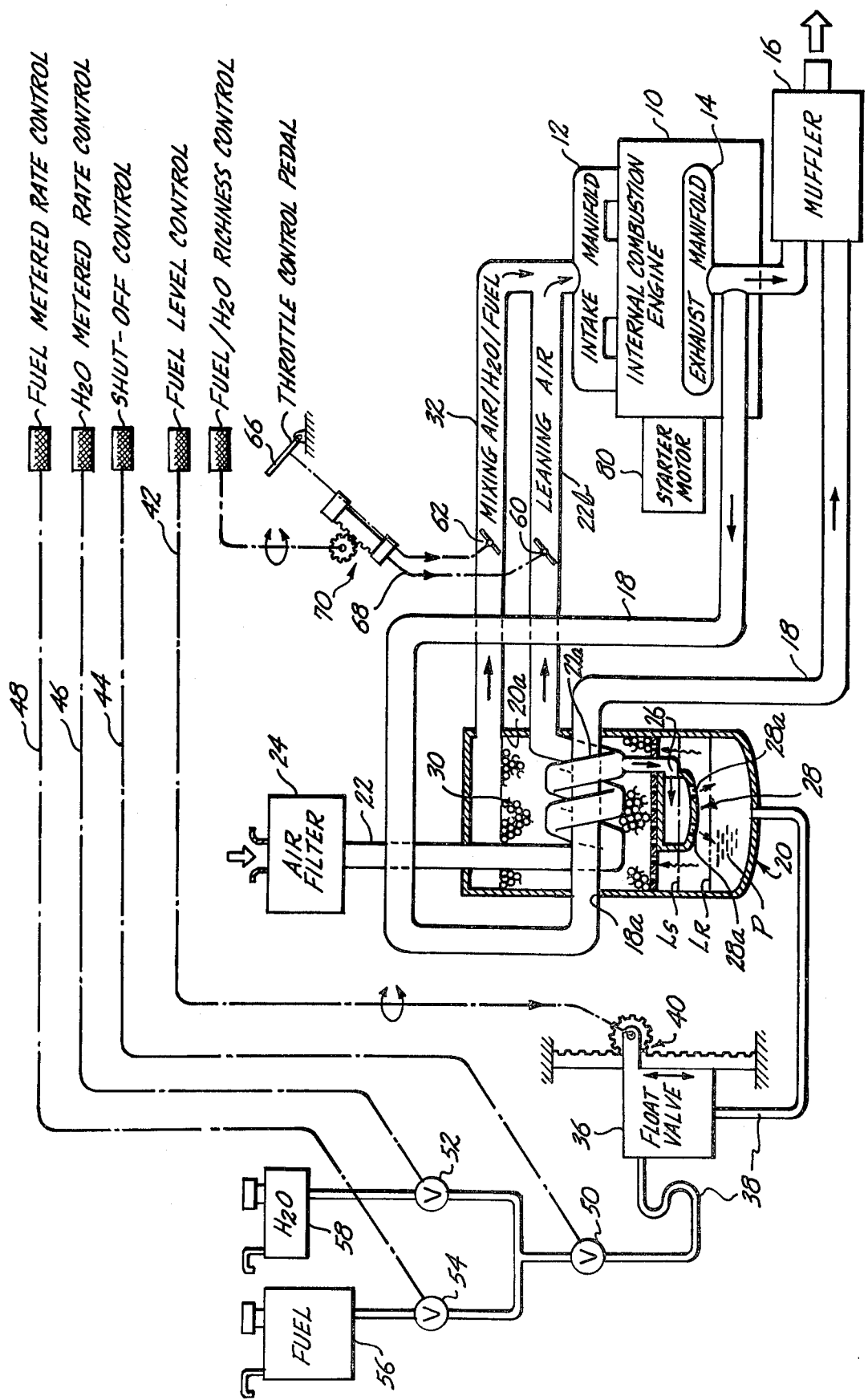

APPARATUS AND A METHOD FOR OPERATING AN INTERNAL COMBUSTION ENGINE

This is a continuation of application Ser. No. 97,418, filed Nov. 26, 1979, which in turn is a continuation-in-part of application Ser. No. 968,555, filed on Dec. 1, 1978, both of which are now abandoned.

BACKGROUND OF THE INVENTION

This invention relates to improvements in fuel supply systems for internal combustion engines. More particularly, the improvements herein disclosed are directed to a novel means for producing and controlling heated water vapors, fuel vapors and combustion air for delivery to the intake manifold of an internal combustion engine.

The effect of adding water vapor to the fuel/air mixture under controlled conditions so as to generate increased power is not new. However, prior devices in general for this purpose have been unduly complex to construct and difficult to adjust and maintain in reliable operation. Moreover, excessive internal engine operating temperatures often attended the generation of increased output power, limiting the use of such prior methods to short-term operation, such as to achieve short bursts of acceleration of an aircraft or other vehicle. A further shortcoming believed to have been experienced heretofore applied to the problem of maintaining a fuel/water balance with combustion air suitable for sustained economical operation after engine warmup, following upon the establishment of a different balance needed for reliable starting and warm-up.

A broad object of the present invention is to overcome these limitations and difficulties with prior water-augmented fuel and air supply systems for internal combustion engines.

A further object hereof is to substantially improve the operating efficiency of internal combustion engines by a novel means for generating and combining heated water vapors and fuel vapors with heated mixing air in the engine fuel supply vaporizer means of the invention.

A further and more specific object is to devise such a fuel supply system wherein an optimum balance or ratio of the three infeed combustion components is inherently and consistently available for cold starting of the engine using simply a conventional starter motor to turn it over, and without necessity for any special starting carburetor, fuel injectors or other auxillary fuel supply apparatus. A related object is to provide such a means which not only provides the requisite starting balance of combustion components, but which maintains a suitable balance during warm-up and thereafter automatically becomes adjusted or may be adjusted by manual means so as to vary the balance ratio of the components for optimum operating economy and maximum power output availability after warm-up, but without overheating of the engine.

A specific object hereof, ancillary to the principal objectives, is to provide such a combustion mixture supply means altogether eliminating the need for a conventional carburetor or complex injector or vaporizer apparatus. More specifically, the invention achieves its objectives with the requirement for moving parts limited to any which serve to throttle or vary the passage of fuel/water vapors and leaning air through the engine and to the means, if any, for compensatively adjusting water/fuel level in the means for vaporizing these components in the presence of mixing air.

With this invention, total vaporization of water and fuel, and complete admixture thereof with a small (mixing) fraction of the combustion air occurs in a heated vaporizer, followed by further dispersal of the vaporous mixing air in the stream of leaning air also preheated before entering the engine intake manifold after engine warm-up. Spark timing may be set back so as to avoid engine overheating without loss of output power and at the same time fuel economy is maximized through automatic leaning of fuel supply (vapor generation) rate, and effective utilization of engine heat to extract energy from the concurrent conversion of water vapor into superheated steam during each combustion cycle.

SUMMARY OF THE INVENTION

In accordance with the preferred embodiment of this invention, engine intake air is preheated and its flow divided, although heated, in a heat exchanger heated by engine exhaust gases. A small fraction of the divided flow of engine intake air drawn by the suction strokes of the engine pistons is passed as mixing air through a vaporizer or exciter, wherein it impinges upon and agitates a pool of fuel and water supplied in a predetermined ratio thereto so as to stimulate the formation of vapors. This vaporization effect of mixing air discharge is essential to supplying fuel vapors for cold engine starts. After engine warm-up, the agitation effect of mixing air discharge against the mixture pool can be and is reduced inasmuch as vaporization by heating increases; moreover, a leaner fuel vapor mixture is essential for fuel economy during sustained engine operation. Preferably, this reduction of mixing air discharge agitation occurs through a lowering of the level of the liquid mixture pool below the mixing air inlet orifices as vaporizer temperature rises into its operating temperature range.

These and other features, objects and advantages of the invention will become more fully evident from the following description by reference to the accompanying drawing.

BRIEF DESCRIPTION OF THE DRAWING

The drawing FIGURE depicts the internal combustion engine fuel supply system of this invention with its functional parts and associated apparatus depicted schematically.

DETAILED DESCRIPTION

As shown, the engine 10 may comprise any suitable internal combustion engine such as an automobile or truck gasoline engine. However, the fuel used need not be gasoline since any combustible liquid fuel that can be vaporized under operating conditions of the invention will serve; for instance, diesel oil. Details of the engine are omitted from the drawing. For present purposes, it suffices to indicate that the engine has an air/fuel intake manifold 12, or equivalent, and an exhaust manifold 14, or equivalent, discharging hot exhaust gases into the atmosphere through muffler 16. Some of the exhaust gases are tapped through a by-pass 18 that passes through a heat exchanger means in fuel/water vaporizer 20. The illustrated heat exchanger means using exhaust gas heat includes means to heat the main body of combustion air being drawn into the engine, namely, a run 18a of exhaust pipe 18 enwrapped by a coil section 22a of air inlet duct 22 that leads from air filter 24 to the leaning air duct 22b, with the latter connected to engine intake manifold 12.

A fractional portion, such as one-fifth, or so, of the indrawn heated atmospheric air, serves as mixing air and is tapped from coil 22a by a pipe 26 that leads into the plenum 28. This heated fractional portion of total combustion air is drawn by suction through orifices 28a that are located and directed so that their discharge agitates the pool of liquid water and fuel (P) maintained in the bottom of chamber 20a and thereby stimulates vaporization thereof.

The heat exchanger means still further includes a means to heat the pool P of liquid water and fuel itself. The heat conductive metal wall of the casing and metal to metal contacts of the parts within the vaporizer cause heating of such fuel and water mixture by heat transfer from exhaust duct 18a.

Further, heat exchange action in the illustrated arrangement applies to the rising currents of heated mixing air after impingement upon the liquid pool P and carrying with them water and fuel vapors developed in the process. This vaporous air is drawn upwardly through a heat exchanger matrix, such as a body of thermally conductive elements illustrated by the metal shot 30 surrounding pipe 18a, and out through a duct 32 also leading to the engine intake manifold 12 where it mixes with heated leaning air from duct 22b. No carburetor as normally used in an internal combustion engine is necessary.

In order to establish a controlled level of the pool of fuel and water in the bottom of the vaporizer chamber 20a, a float valve 36 is interposed in the common liquid supply line 38. The body of float valve 36 can be moved up or down automatically or at will so as to vary the reference liquid level at which it regulates. This adjustability feature is depicted schematically by the rack-and-pinion mechanism 40 remotely controlled by a drive cable 42. Other control cables 44, 46 and 48 are shown to permit, respectively, varying the setting of fuel/water cutoff valve 50, water rate metering valve 52 and fuel flow rate metering valve 54. Fuel in tank 56 leads through a fuel line through valve 54 to common line 38; water in tank 58 leads through a fuel line through valve 52 to common line 38. As a practical matter, fuel and water pumps may be used in lieu of the simple gravity feed system depicted. Valves 54 and 52, for example, may be replaced by constant rate fuel and water pumps, respectively.

Rate of flow of heated leaning air into engine 10 is controlled by a butterfly valve 60 varied in its setting in duct 22b by a suitable remote control such as a throttle control pedal 66 acting through a connector cable 68. A butterfly valve 62 in duct 32 also actuated by the pedal 66 controls the inflow rate of vaporous heated mixing air in coordination with the setting of butterfly valve 60. A separate control for adjustment in the relative settings of the coordinated butterfly valves may be provided by way of the cableactuated rack-and-pinion mechanism 70 as shown, permitting superimposing an increase or decrease in the richness of airborne water/fuel vapors being delivered to the engine for each throttle control setting established during engine operation. It will be appreciated that the demand (i.e., the suction pressure) imposed on both the vaporizer and on the leaning air sources varies as a function of engine speed. The float valve and associated liquid supply line valving limit the fuel and water flow at controlled values, against that demand. Vaporous mixing air flow to the intake 12 is limited by the setting of the throttle butterfly 62. The same is true of leaning air flow rate limited or controlled by throttle butterfly 60.

In the preferred starting and operating mode sequence made possible by this invention, liquid fuel/water vapors are generated to the maximum extent required for starting the engine cold by setting the float valve so as to establish the level of the pool of fuel and water below the discharge orifices 28a in plenum 28a. Under these cold starting conditions, operation of starter motor 80 turning over the engine produces a partial vacuum in manifold 12 that is applied to the vaporizer chamber. This negative pressure sucks air into the plenum 28 and out through the orifices 28a and, by bubbling action, through the water/fuel pool P, to agitate the liquid. This agitation accompanied by negative pressure applied to the surface of the pool stimulates the production of fuel vapors for starting the engine. The amount of water vaporization and even the extent of complete vaporization of the high vapor point fuel fractions during a cold start is limited. However, such vaporization of fuel components as does occur under these conditions, even on cold days, is sufficient to start the engine. While not shown in the illustration, some initial preheating of the heat exchanger may also be desirable if the thermal mass and thermal conductivity of the embedding matrix 30 are great, especially in very cold weather, so as to minimize recondensation of vapors on metal surfaces impeding cold starts.

In practicing the preferred sequence, once the engine is running and is approaching normal operating temperature, the level of liquid in pool P tends to drop partly due to increased vapor pressure in the chamber 20a due to the elevated temperatures of all media and surfaces therein. It is desirable with the engine operating at normal running temperatures for this liquid level to drop below the orifices 28a so as to reduce the agitating effect of their air discharges. If necessary to accomplish this reduction, the reference level of float valve 36 itself may be manually or automatically lowered (from level $L_S$ to level $L_R$) so as to place the surface of the fuel/water mixture pool P below the level of air discharge orifices 28a. When this new level relationship is established, the bubbling agitation of pool liquids ceases and, instead, the air drawn from orifices 28a merely fans the surface of the pool. As a result, the desired leanness of vaporous air mixture entering the engine intake manifold 12 is obtained at normal operating temperatures for maximum fuel economy in engine operation.

In either the engine starting stage or the engine sustained operating stage of fuel vaporizer action, the desired vaporization efficiency is achieved without need for moving parts and without complex mechanical or electrical devices. It is found during sustained operation that a kind of colloidal suspension or effervescence effect occurs in the pool of fuel and water, with the component liquids, including fuel fractions, forming into tiny globules. This is due to the combined effects of partial vacuum, agitation (through bubbling action or surface fanning) and heating of both the mixture itself as well as of the fractional (mixing) air being delivered into the vaporizer chamber. Effective vaporization of the water and all fuel components is readily achieved under these conditions. This, together with continued heating of the resultant vapors and mixing air inflowing upwardly and out of the vaporizer, assures optimum conditioning for delivery of the heated vaporous mixing air into the combustion chambers of the engine.

Exhaust pollutants from an engine operating with this invention are minimized due to the resultant completeness of combustion and apparently also due to the effects of water present in the form of superheated steam during the combustion cycle. In a typical case, the vaporizer may be operated in the range of 1000° F., more or less. In any case, the heat exchanger design should be such as to subject the fuel components to vapor producing temperatures under sustained operation, temperatures typically in the range above about 450° F. for most grades of gasoline. If desired, a thermostatic exhaust flow control (not shown) may be employed to maintain vaporizer temperature in the range of about 1000° F. or at any other selected operating temperature, using well-known methods.

While not shown, conventional vacuum advance systems to control spark timing may also be retained in engines using this invention, as may be step-function throttle infeed ducting controls to increase engine draw in times of heavy acceleration demands. If desired, an automatic choke mounted and operated in a conventional manner in the (leaning) air duct 22b may also be used. Typically, with a water vapor injection system such as this, spark timing is preferably retarded during normal sustained engine operation, below the timing setting used with plain fuel operation. In this way, and by employing the novel vaporizer system disclosed, engine operating temperature is readily maintained within safe limits despite the addition of water to the fuel by as much as one-fifth to one-sixth the amount of fuel being consumed, which represents the recommended ratio component for gasoline, diesel oil and most other petro-carbon fuels commercially available.

These and other aspects of the invention will be understood by persons skilled in the art of internal combustion engine design and operation, as will the fact that design specifics may vary from the illustrative embodiment, with respect to the vaporizer, the associated heat exchanger means, the fuel, air and water supply arrangements, and the control devices used, as well as any other or auxillary apparatus used and the operating conditions employed in the system. The inventive combination and concepts as defined in the appended claims are thus intended to be illustrated by, but not limited by, the details of the foregoing disclosure of the preferred technique and embodiment to practice the invention.

The embodiments of the invention in which an exclusive property or privilege is claimed are defined as follows:

1. In combination with an internal combustion engine having an intake manifold sustaining a partial vacuum during engine operation, and an exhaust manifold discharging hot exhaust gases from the engine, fuel and water vaporizer means having a mixing chamber therein with liquid fuel and water inlet means, and with a vapor outlet in the upper portion of said chamber connected to said intake manifold so as to subject the chamber interior to the partial vacuum of said intake manifold, primary fuel supply means operable to maintain a pool of mixed non-water soluble liquid fuel and water in selected ratio in said chamber, mixing air supply means through which mixing air is drawn from the atmosphere into said chamber by the partial vacuum therein, said mixing air supply means including air inlet orifice means relatively located and directed in said chamber to agitate the pool of liquid fuel and water to stimulate vaporization thereof, heat exchanger means connected with the engine exhaust manifold and operable to heat the vaporizer means and thereby the mixing air and the pool of fuel and water, whereby vaporization of fuel and water and the admixture thereof with mixing air for flow into the intake manifold occurs within said chamber under the combined effects of engine exhaust heat, said mixing air inflow agitation and the partial vacuum within said chamber, leaning air supply means also connected to the intake manifold for drawing atmospheric air into the engine in by-pass relation to said vaporizer means chamber, and engine throttle means operable to vary the flow of leaning air and the flow of vapor-laden mixing air in controlled relationship to the intake manifold.

2. In combination with an internal combustion engine having an intake manifold sustaining a partial vacuum during engine operation, and an exhaust manifold discharging hot exhaust gases from the engine, fuel and water vaporizer means having a mixing chamber therein with liquid fuel and water inlet means, and with a vapor outlet in the upper portion of said chamber connected to said intake manifold so as to subject the chamber interior to the partial vacuum of said intake manifold, primary fuel supply means for said engine operable to feed non-water soluble liquid fuel and liquid water in selected ratio into said chamber, means to vaporize the liquid in said chamber and mix the same with air in a mixture ratio decreasing in vapor richness with increase of engine temperature including mixing air supply means through which mixing air is drawn from the atmosphere into said chamber by the partial vacuum therein, said mixing air supply means including air inlet orifice means relatively located and directed in said chamber to stimulate vaporization of unvaporized liquid therein, heat exchanger means connected with the engine manifold and operable to heat the vaporizer means and thereby increase the rate of thermal vaporization of liquid fuel and water therein and the admixture thereof with mixing air for flow into the intake manifold, leaning air supply means also connected to the intake manifold for drawing atmospheric air into the engine in by-pass relation to said vaporizer means chamber, and engine throttle means operable to vary the flow of leaning air and the flow of vapor-laden mixing air in controlled relationship to the intake manifold.

3. In a water-augmented primary fuel supply system for internal combustion engines having fuel/air suction intake means and an exhaust means, dual path means for conducting combustion air to said intake means including a first path means for leaning air and a second path means for mixing air, vaporizer means in said second path, including a closed container placed under suction by said intake means and having air inlet jet orifice means through which atmospheric mixing air is drawn into said container by said suction, fuel supply means to feed non-water soluble liquid fuel and water in selected ratio into a common mixing space in said container in position for agitative impingement thereon by the air inlet jet orifice air flow, thereby to stimulate vaporization of the two liquids, and means operable in conjunction with the combined effects of said intake means, suction and agitative impingement to vary the degree of such agitative impingement and thereby to reduce the vapor richness of the mixture of mixing air with water and fuel vapors with increased engine operating temperature including heating means connected with the engine exhaust operable to heat the vaporizer means including the atmospheric air drawn into the same through said orifice means.

4. In combination with an internal combustion engine having an intake manifold sustaining a partial vacuum during engine operation, and an exhaust manifold discharging hot exhaust gases from the engine, fuel and water vaporizer means having a mixing chamber therein with liquid fuel and water inlet means, and with a vapor outlet in the upper portion of said chamber connected to said intake manifold so as to subject the chamber interior to the partial vacuum of said intake manifold, primary fuel supply means for said engine operable to feed non-water soluble liquid fuel and water in selected ratio into said chamber, mixing air supply means through which mixing air is drawn from the atmosphere into said chamber by the partial vacuum therein, said mixing air supply means including air inlet orifice means relatively located and directed in said chamber to impinge liquid fuel and water in the chamber to stimulate vaporization thereof, particularly of the liquid fuel when the chamber is cold, heat exchanger means connected with the engine manifold and operable to heat the vaporizer means and thereby increase the rate of thermal vaporization of fuel and water in the chamber and the admixture thereof with mixing air for flow into the intake manifold as the engine heats up, leaning air supply means also connected to the intake manifold for drawing atmospheric air into the engine in by-pass relation to said vaporizer means chamber, engine throttle means operable to vary the flow of leaning air and the flow of vapor-laden mixing air in controlled relationship to the intake manifold, and means to vary the relative levels of accumulated liquid in the chamber and of said inlet orifice means in said chamber through a range, with the orifice means submerged in such liquid in the chamber bottom at one extreme of said range with the engine and the chamber cold, and with the orifice means above said liquid at the opposite extreme.

5. In combination with an internal combustion engine having an intake manifold sustaining a partial vacuum during engine operation, and an exhaust manifold discharging hot exhaust gases from the engine, fuel and water vaporizer means having a mixing chamber therein with liquid fuel and water inlet means, and with a vapor outlet in the upper portion of said chamber connected to said intake manifold so as to subject the chamber interior to the partial vacuum of said intake manifold, primary fuel supply means for said engine operable to feed non-water soluble liquid fuel and water in selected ratio into said chamber, mixing air supply means through which mixing air is drawn from the atmosphere into said chamber by the partial vacuum therein, said mixing air supply means including air inlet orifice means relatively located and directed in said chamber to impinge liquid in the chamber to stimulate vaporization thereof, and particularly of the fuel with the chamber cold, heat exchanger means connected with the engine exhaust manifold and operable to heat the vaporizer means as the engine heats up and thereby increase the rate of thermal vaporization of fuel and water and the admixture thereof with mixing air for flow into the intake manifold, leaning air supply means also connected to the intake manifold for drawing atmospheric air into the engine in by-pass relation to said vaporizer means chamber, and engine throttle means operable to vary the flow of leaning air and the flow of vapor-laden mixing air in controlled relationship to the intake manifold, the fuel supply means in conjunction with internal vaporizer pressure and temperature being operable to establish the level of fuel in the chamber bottom above the orifice means with the engine undergoing a cold start.

6. In combination with an internal combustion engine having an intake manifold sustaining a partial vacuum during engine operation, and an exhaust manifold discharging hot exhaust gases from the engine, fuel and water vaporizer means having a mixing chamber therein with liquid fuel and water inlet means, and with a vapor outlet in the upper portion of said chamber connected to said intake manifold so as to subject the chamber interior to the partial vacuum of said intake manifold, primary fuel supply means for said engine operable to feed non-water soluble liquid fuel and water in selected ratio into said chamber, mixing air supply means through which mixing air is drawn from the atmosphere into said chamber by the partial vacuum therein, said mixing air supply means including air inlet orifice means relatively located and directed in said chamber to impinge the liquid in the chamber to stimulate vaporization thereof, heat exchanger means connected with the engine exhaust manifold and operable to heat the vaporizer means and thereby increase the rate of thermal vaporization of fuel and water and the admixture thereof with mixing air for flow into the intake manifold, leaning air supply means also connected to the intake manifold for drawing atmospheric air into the engine in by-pass relation to said vaporizer means chamber, and engine throttle means operable to vary the flow of leaning air and the flow of vapor-laden mixing air in controlled relationship to the intake manifold, the fuel supply means being operable before engine warm-up to establish the level of liquid in the chamber bottom above said orifice means, whereupon heating of the vaporizer means and thereby of the mixing air and fuel and water mixture therein after engine warm-up effects lowering of the liquid level and thereby reduction of the agitating effect of the orifice means discharge.

7. In combination with an internal combustion engine having an intake manifold sustaining a partial vacuum during engine operation, and an exhaust manifold discharging hot exhaust gases from the engine, fuel and water vaporizer means having a mixing chamber therein with liquid fuel and water inlet means, and with a vapor outlet in the upper portion of said chamber connected to said intake manifold so as to subject the chamber interior to the partial vacuum of said intake manifold, primary fuel supply means for said engine operable to feed non-water soluble liquid fuel and water in selected ratio into said chamber, mixing air supply means through which mixing air is drawn from the atmosphere into said chamber by the partial vacuum therein, said mixing air supply means including air inlet orifice means relatively located and directed in said chamber to agitate liquid in the chamber bottom to stimulate vaporization thereof, heat exchanger means connected with the engine manifold and operable to heat the vaporizer means and thereby increase the rate of thermal vaporization of fuel and water and the admixture thereof with mixing air for flow into the intake manifold, leaning air supply means also connected to the intake manifold for drawing atmospheric air into the engine in by-pass relation to said vaporizer means chamber, and engine throttle means operable to vary the flow of leaning air and the flow of vapor-laden mixing air in controlled relationship to the intake manifold, the heat exchanger means including a duct in heat exchange relationship with the interior of the mixing chamber, and a matrix body of thermally conductive elements in said chamber in thermal transfer contact with said duct and forming interstices through which vapor-laden mixing air passes and is heated in being drawn by partial vacuum to the intake manifold.

* * * * *

UNITED STATES PATENT AND TRADEMARK OFFICE
CERTIFICATE OF CORRECTION

PATENT NO. : 4,368,711

DATED : January 18, 1983

INVENTOR(S) : Larry D. Allen

It is certified that error appears in the above-identified patent and that said Letters Patent is hereby corrected as shown below:

On the title page assignee should read:

-- (73) Assignee: Harry W. Rose; Robert S. Harrison; Donald T. Lindsey; Ansell G. Johnson; Harbour, Hisel & Kraft, part interest. --

Signed and Sealed this

Fourteenth Day of August 1984

[SEAL]

Attest:

GERALD J. MOSSINGHOFF

Attesting Officer

Commissioner of Patents and Trademarks